Jan. 18, 1938.  J. G. HOMAN  2,106,097
CANDY NOVELTY
Filed Feb. 23, 1935
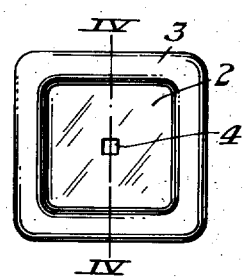
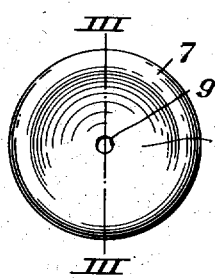
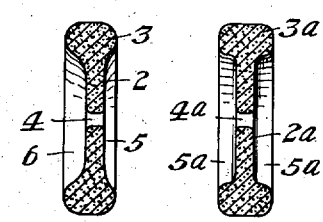
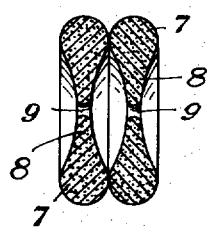
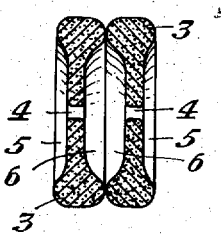
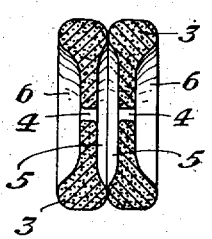
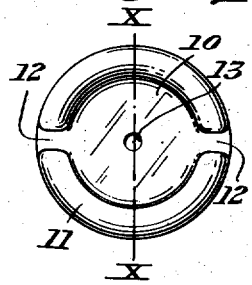
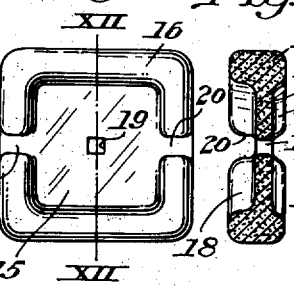
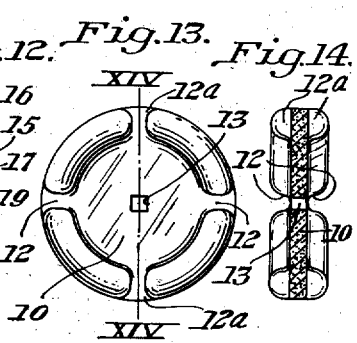
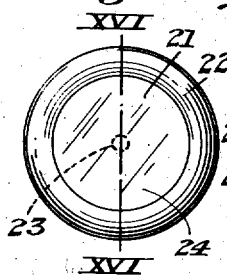
INVENTOR
John G. Homan
by his attorneys Patented Jan. 18, 1938

2,106,097

UNITED STATES PATENT OFFICE 2,106,097

CANDY NOVELTY

John G. Heman, Steubenville, Ohio

Application February 23, 1935, Serial No. 7,891

10 Claims. (Cl. 46—175)

This invention relates to candies and, more particularly to hard candy of the lozenge type.

Lozenge-like hard candies of various shapes are sold at the present time very extensively in tightly wrapped packages. Typical of this class of candies are those sold under the trademark "Life-Savers". Such candies have utility only as a confection. According to the present invention, it is contemplated that the construction and shape of the candy be such that they may be used as a whistle while they are simultaneously being consumed as a confection. As the confection dissolves in the mouth, the tone or pitch of the whistle changes.

Where the candy is of the lozenge type, this whistle may be formed by placing two of the lozenges together. This has a commercial advantage in that the consumer is stimulated to use two lozenges at a time instead of one.

The invention may be readily understood by reference to the accompanying drawing, in which Figure 1 represents a plan view of one form of candy embodying my invention;

Figure 2 is a similar view of a modified form;

Figure 3 is a transverse section in the plane of line III—III of Figure 2;

Figure 4 is a transverse section in the plane of line IV—IV of Figure 1;

Figure 5 is a section similar to Figure 4 showing a slightly modified form of lozenge;

Figure 6 is a transverse section showing the complete whistle;

Figure 7 is a similar section showing another form of whistle constructed from two lozenges of the type shown in Figure 4, with the shallow sides of the lozenge turned outwardly;

Figure 8 is a view similar to Figure 7 showing a whistle formed from two lozenges of the type illustrated in Figure 4 with the shallow sides turned inwardly;

Figure 9 is a plan view of still another modification;

Figure 10 is a transverse section in the plane of line X—X of Figure 9;

Figure 11 is a plan view of another modification;

Figure 12 represents a transverse section in the plane of line XII—XII of Figure 11;

Figure 13 is a plan view showing a candy of the general type shown in Figure 9, but still further modified;

Figure 14 represents a transverse section in the plane of line XIV—XIV of Figure 13;

Figure 15 is a plan view of a still further modification;

Figure 16 is a transverse section in the plane of line XVI—XVI of Figure 15; and Figure 17 is a transverse section representing a complete whistle formed by the placing together of two lozenges of the type shown in Figure 9.

It will be understood that the various embodiments of the invention herein shown and hereinafter described are merely illustrative of typical embodiments of my invention and that the invention is not to be construed as being limited in any way to the particular shapes shown. Moreover, the drawing shows the candy somewhat larger than actual size, merely for the purpose of illustration.

Referring first to Figures 1, 4, 7, and 8, there is disclosed in Figures 1 and 4 a candy having a body portion or web portion 2 with a marginal flange or bead portion 3 thereon. This candy is a hard candy. In the center of the web 2 is a small hole 4. The hole may be either square or round or any other shape, but it is necessary that the hole have a relatively small area compared with the total area of the web. Looking at Figure 4, it will be noted that in this particular embodiment the web portion 2 is to one side of the central plane of the candy so as to provide a relatively shallow recess 5 on one face of the candy and a relatively deeper recess 6 on the other face. When these two candies are placed together in face to face relation as shown in Figures 7 and 8, they form a composite body in which there is a central chamber with the holes 4 of the two lozenges in alignment. If this body is held between the lips in a vertical position and the user blows or sucks air through the confection, a whistling sound will be produced. If the two lozenges are placed together as shown in Figure 7, with the deep cavities 6 together and the shallow cavities turned out, the whistle will have a different tone quality than if the two lozenges are put together as shown in Figure 8 with the shallow cavities together and the deep cavities turned out. Obviously, a further modification may be made by placing the two lozenges together in such fashion that a deep cavity and a shallow cavity are opposed, and a deep cavity and a shallow cavity turned out. By reason of this possible variation in the arrangement of the two lozenges, various whistling effects can be produced. In order for the whistle to function, the holes 4, as stated above, must be relatively small compared with the areas of the webs 2 and also relatively small compared with the size of the internal cavity. As the candy continues to be used as a whistle, it is slowly dissolved. Dissolution will ordinarily occur most rapidly at the central hole, tending to enlarge the hole. As the hole enlarges, the quality of the whistle changes until finally the candy will no longer function as a whistle.

It is not necessary for the purposes of the present invention to have the central web 2 offset from the central plane of the candy. It may have its central plane coincide with the central plane of the candy shown in Figure 5, wherein 2a designates the web portion, 3a the flange or bead portion, and 4a is the central hole. The cavities 5a at each side of the web are the same depth. Obviously, however, the arrangement shown in Figures 1, 4, 7, and 8 is at present deemed preferable because of the variety of whistles which two lozenges can produce.

In the arrangement shown in Figures 2, 3, and 6, the general construction of the candy is similar to that previously described, but I have illustrated the lozenge as being circular and as having the faces thereof concave, there being a less sharp shoulder between the bead portion designated 7 and the web portion designated 8, the two portions merging to form a practically continuous smooth outer face. The web portion 8 is provided with a central hole 9 and, of course, the hole 9 must have a relatively small area as compared with the area of the web portion. By reason of the difference in shape of this form over that previously described, there is, of course, some difference in the quality of the whistling note which is produced. It will, of course, be understood that the arrangement shown in Figures 2, 3, and 6 can be modified to embody the idea described in connection with Figures 1, 4, 7, and 8, all having the concavity on one side of the candy deeper than that on the other.

In the modification shown in Figures 9, 10, and 17, the candy has a web portion 10 and a bead portion 11. The bead portion 11 is provided with diametrically opposite notches 12 therein. In addition, the candy may have a small central hole 13, although the small hole 13 is optional in this form. With this form of candy, two of the lozenges are placed together in face-to-face relation as shown in Figure 17, with the notches 12 in the two candies registering. The composite body formed by thus placing together two lozenges, may be held horizontally between the lips, the air entering and discharging from the central cavity formed between the two web portions passing through the openings formed by the registering notches 12. Here again, the area of the notches must be relatively small as compared with the total area of the candies in order to produce the desired whistling effect. If the holes 13 are also provided, the composite body can be used as a whistle either in a vertical or in a horizontal position, and the quality of the whistling note will vary according to the direction in which the body is used.

Figures 11 and 12 show generally the embodiment of Figures 9, 10, and 17, except that these figures further include the offsetting of the central web with respect to the central plane of the candy, thereby having shallower recesses on one side of the web than on the other. In these figures, 15 designates the body or web portion of the candy, and 16 is the flange or bead portion which in this figure is offset with respect to the central plane of the candy, so that there is a relatively shallow recess 17 on one face and a relatively deeper recess on the other face. The candy is provided with a small central opening 19 and with notches 20 in the marginal or bead portion, the notches 20 being diametrically opposite. The hole 19 may be omitted in this form if desired. This candy is used in the same way that the one shown in Figures 9, 10, and 17 is used, but has the advantage that the candies can be combined in three different ways as described in connection with Figure 1, by either putting two candies together in such way that the two shallow recesses are opposite or the two deeper recesses are opposite, or one shallow and one deep recess are opposite each other.

Figure 13 illustrates a modification similar to Figures 9 and 10, and the same reference numerals have been used, except that in addition to the notches 12, there are other notches 12a positioned 90° from the notches 12, merely giving a wider variety of positions in which the two candies may be joined. The central hole 13 in this case is also shown as being square instead of circular. It has previously been pointed out that the shape of the central hole is more or less optional.

Figures 15 and 16 show a candy of the general type shown in Figure 2, wherein there is a central web portion 21 with a bead portion 22 and a central hole 23. The cavities 24 on the opposite faces of the candy and the central hole are filled with a softer material which will disintegrate much more rapidly in the mouth than the body of the lozenge. This filling is designated 25. It may, for example, be of milk chocolate or a soft cream-like filling. The object of the filling is not only to provide a convenient way of furnishing the consumer with two types of candy in a single unit, but where two candies with this filling are put together as described in connection with the preceding forms and they are held in the mouth, a whistling sound cannot be produced until the softer filling material has been dissolved or disintegrated. The candies can thus be amusingly used in a whistling race to see which of two consumers can first make the candy whistle. The idea of using a softer filling as specifically illustrated in Figures 15 and 16 could, of course, be applied to any of the other shapes of candies herein described. Moreover, instead of making the body of the whistle as shown in Figures 6, 7, 8 or 14, of two lozenges, my invention contemplates that a body of a similar character may be integrally formed. This can conveniently be done by making the body of the candy about a central filling of a more readily soluble type.

The invention as illustrated in the typical embodiments as herein described provides a novelty wherein in addition to being an edible confection, the candy may furnish amusement as a whistle and the whistle will change in tone quality as the candy gradually dissolves. Incidentally, such a whistle is much safer than metal whistles which are some times sold in connection with the so-called penny candies, inasmuch as children not infrequently swallow the small metal whistles. If a whistle as made in accordance with this invention is swallowed, it will dissolve. The term "candy" as used herein also contemplates chewing gum, particularly chewing gum coated with a hard sugar or candy coating.

I claim:

1. A candy novelty comprising a body formed of hard candy having a central chamber therein with confining walls, said candy having aligned small openings in opposite walls, the area of the openings being relatively small as compared with the area of the cavity and being so arranged that when the candy is placed in the mouth air may be blown through the openings to produce a whistling effect.

2. A confection comprising a lozenge-shaped body having concave faces, said body having a small centrally positioned sound forming hole therethrough leading from one concave face to the other, the diameter of the hole and the concavity of the faces being so proportioned as to enable two such confections when placed in face-to-face relation to form a whistle.

3. A confection comprising a lozenge-shaped body of hard candy having a relatively thin web portion and a relatively thicker bead portion whereby said body has a recess in at least one face thereof, said web having a small sound forming hole therethrough, the diameter of the hole being relatively small as compared with the total diameter of the lozenge, the proportions of the web, bead and hole being such as to enable two such confections when placed in face-to-face relation to form a whistle.

4. A confection comprising a lozenge-shaped body of hard candy having a relatively thin web portion and a relatively thicker bead portion whereby said body has a recess in at least one face thereof, said web having a small hole therethrough, the diameter of the hole being relatively small as compared with the total diameter of the lozenge, and a filling of a more soluble candy than the said body in the recess in the face of the body, the proportions of the web, bead and hole being such as to enable two such confections when placed in face-to-face relation to form a whistle.

5. A confection comprising a lozenge-like body of hard candy having concave faces and having a small hole therethrough leading from one face to the other, the concavity in one face being of a different dimension from the concavity in the other face, the shape of the body and the size of the hole being such that when it is placed in face-to-face relation with a similar body a whistle will be formed, the pitch of the whistle being determined by which faces of the two bodies are opposed, said body being adapted to form a whistle when placed in face to face relation with a similarly formed confection.

6. A confection comprising a lozenge-like body having a bead portion and a web portion, the body having a recess in at least one face thereof, said bead portion being provided with diametrically opposite notches of relatively small dimension, said body being adapted to form a whistle when placed in face-to-face relation with a similarly formed confection.

7. A confection comprising a lozenge-like body having a bead portion and a web portion, the body having a recess in at least one face thereof, said bead portion being provided with diametrically opposite notches of relatively small dimension, said body being adapted to form a whistle when placed in face-to-face relation with a similarly formed confection, said body also having a central hole through the web thereof.

8. A confection comprising also a whistle, said confection comprising a body of hard candy having a central chamber therein and having small registering passageways leading into and out of the chamber, said chamber having a filling of a relatively softer more easily dissolved candy which may be dissolved out before the candy will function as a whistle.

9. As a new article of manufacture, a whistle formed of hard candy with sound forming air passages therein so arranged that as the whistle is used the air passages are caused to change in size and thereby change the quality of the whistle.

10. As a new article of manufacture, a whistle formed of hard candy of such nature that it may be very slowly dissolved, said whistle having an interior cavity and having air passages, and a filling of quickly soluble material in said cavity which is first dissolved out before said whistle will function.

JOHN G. HOMAN.

CERTIFICATE OF CORRECTION.

Patent No. 2,106,097.    January 18, 1938.

JOHN G. HOMAN.

It is hereby certified that error appears in the printed specification of the above numbered patent requiring correction as follows: Page 3, second column, lines 4, 5 and 6, claim 5, strike out the comma and words ", said body being adapted to form a whistle when placed in face to face relation with a similarly formed confection"; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

openings being relatively small as compared with the area of the cavity and being so arranged that when the candy is placed in the mouth air may be blown through the openings to produce a whistling effect.

2. A confection comprising a lozenge-shaped body having concave faces, said body having a small centrally positioned sound forming hole therethrough leading from one concave face to the other, the diameter of the hole and the concavity of the faces being so proportioned as to enable two such confections when placed in face-to-face relation to form a whistle.

3. A confection comprising a lozenge-shaped body of hard candy having a relatively thin web portion and a relatively thicker bead portion whereby said body has a recess in at least one face thereof, said web having a small sound forming hole therethrough, the diameter of the hole being relatively small as compared with the total diameter of the lozenge, the proportions of the web, bead and hole being such as to enable two such confections when placed in face-to-face relation to form a whistle.

4. A confection comprising a lozenge-shaped body of hard candy having a relatively thin web portion and a relatively thicker bead portion whereby said body has a recess in at least one face thereof, said web having a small hole therethrough, the diameter of the hole being relatively small as compared with the total diameter of the lozenge, and a filling of a more soluble candy than the said body in the recess in the face of the body, the proportions of the web, bead and hole being such as to enable two such confections when placed in face-to-face relation to form a whistle.

5. A confection comprising a lozenge-like body of hard candy having concave faces and having a small hole therethrough leading from one face to the other, the concavity in one face being of a different dimension from the concavity in the other face, the shape of the body and the size of the hole being such that when it is placed in face-to-face relation with a similar body a whistle will be formed, the pitch of the whistle being determined by which faces of the two bodies are opposed, said body being adapted to form a whistle when placed in face to face relation with a similarly formed confection.

6. A confection comprising a lozenge-like body having a bead portion and a web portion, the body having a recess in at least one face thereof, said bead portion being provided with diametrically opposite notches of relatively small dimension, said body being adapted to form a whistle when placed in face-to-face relation with a similarly formed confection.

7. A confection comprising a lozenge-like body having a bead portion and a web portion, the body having a recess in at least one face thereof, said bead portion being provided with diametrically opposite notches of relatively small dimension, said body being adapted to form a whistle when placed in face-to-face relation with a similarly formed confection, said body also having a central hole through the web thereof.

8. A confection comprising also a whistle, said confection comprising a body of hard candy having a central chamber therein and having small registering passageways leading into and out of the chamber, said chamber having a filling of a relatively softer more easily dissolved candy which may be dissolved out before the candy will function as a whistle.

9. As a new article of manufacture, a whistle formed of hard candy with sound forming air passages therein so arranged that as the whistle is used the air passages are caused to change in size and thereby change the quality of the whistle.

10. As a new article of manufacture, a whistle formed of hard candy of such nature that it may be very slowly dissolved, said whistle having an interior cavity and having air passages, and a filling of quickly soluble material in said cavity which is first dissolved out before said whistle will function.

JOHN G. HOMAN.

CERTIFICATE OF CORRECTION.

Patent No. 2,106,097.                                January 18, 1938.

JOHN G. HOMAN.

It is hereby certified that error appears in the printed specification of the above numbered patent requiring correction as follows: Page 3, second column, lines 4, 5 and 6, claim 5, strike out the comma and words ", said body being adapted to form a whistle when placed in face to face relation with a similarly formed confection"; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.

CERTIFICATE OF CORRECTION.

Patent No. 2,106,097.  January 18, 1938.

JOHN G. HOMAN.

It is hereby certified that error appears in the printed specification of the above numbered patent requiring correction as follows: Page 3, second column, lines 4, 5 and 6, claim 5, strike out the comma and words ", said body being adapted to form a whistle when placed in face to face relation with a similarly formed confection"; and that the said Letters Patent should be read with this correction therein that the same may conform to the record of the case in the Patent Office.

Signed and sealed this 22nd day of February, A. D. 1938.

(Seal)

Henry Van Arsdale,
Acting Commissioner of Patents.